Feb. 10, 1948.    R. H. VARIAN ET AL    2,435,615
OBJECT DETECTING AND LOCATING SYSTEM
Filed Sept. 30, 1941    9 Sheets-Sheet 1
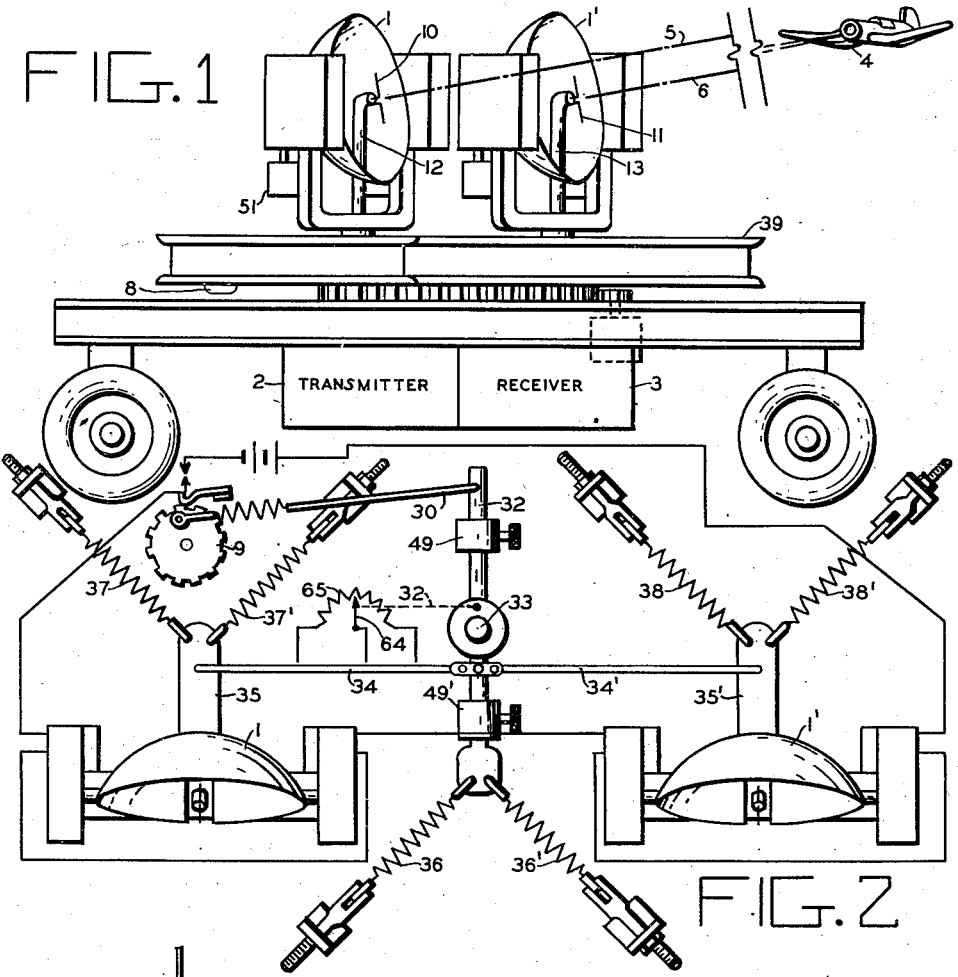
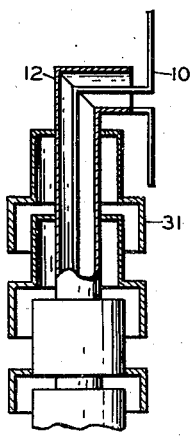
INVENTORS
RUSSELL H. VARIAN
WILLIAM W. HANSEN
BY JOHN R. WOODYARD
ATTORNEY

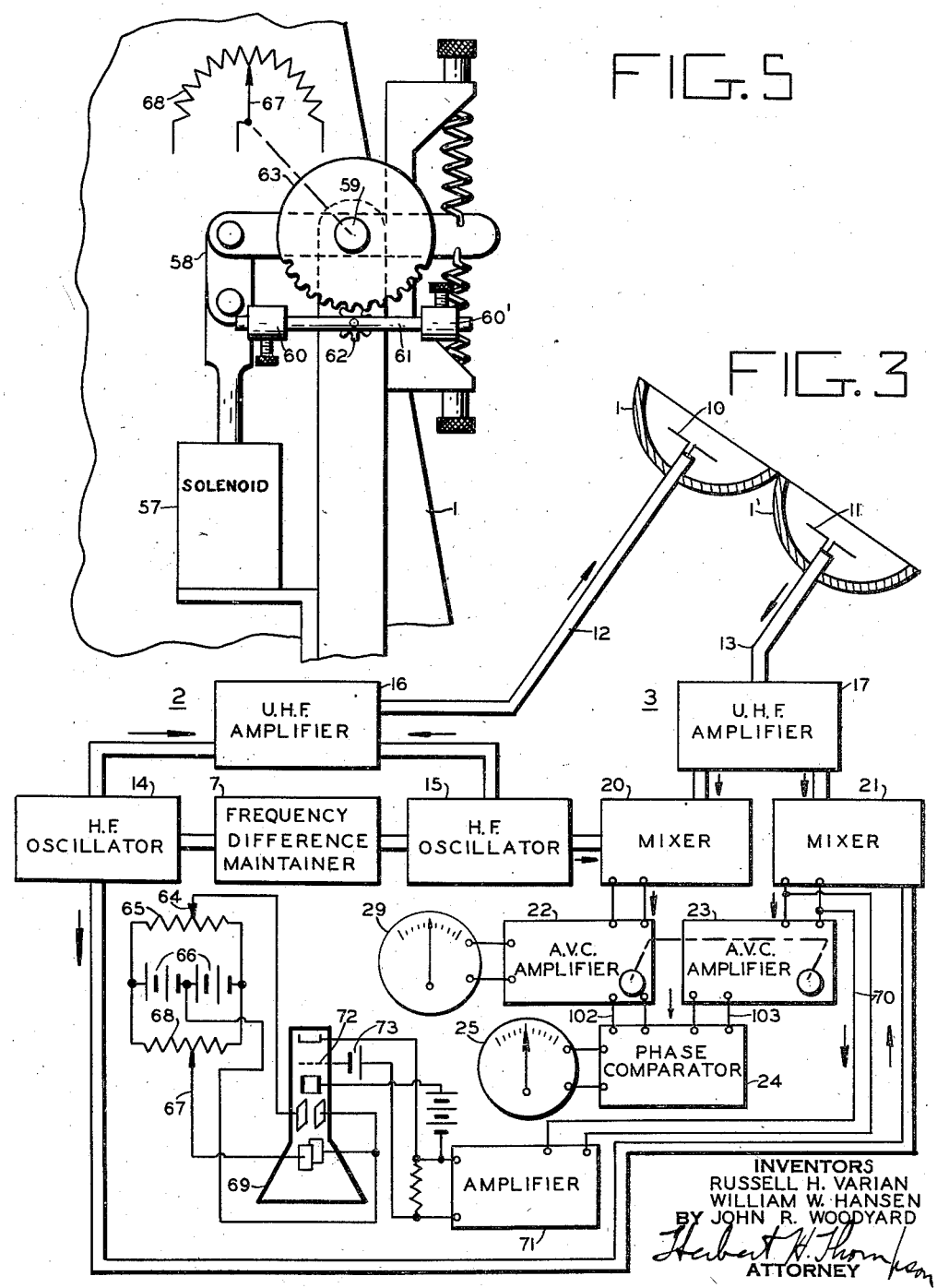

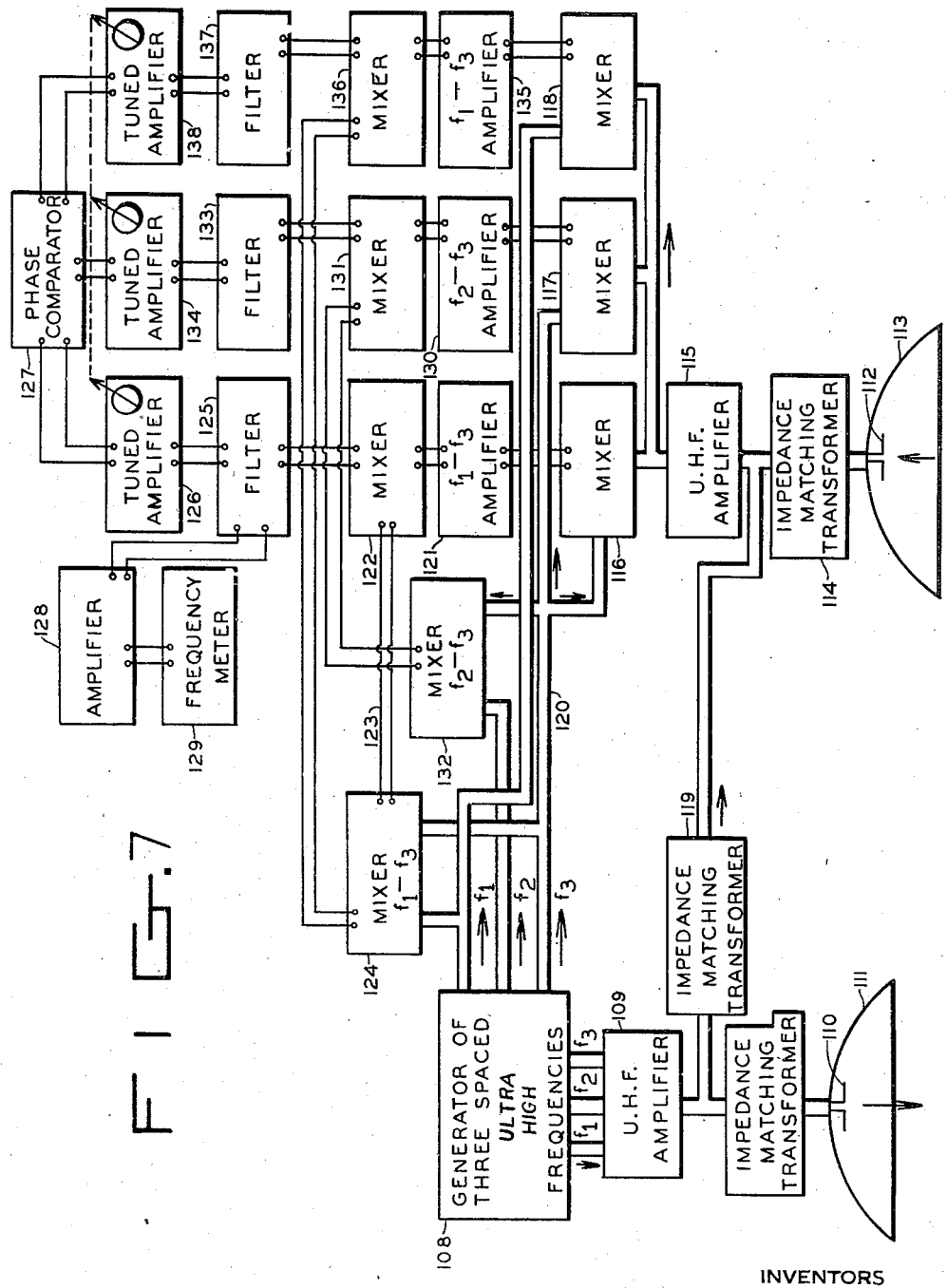

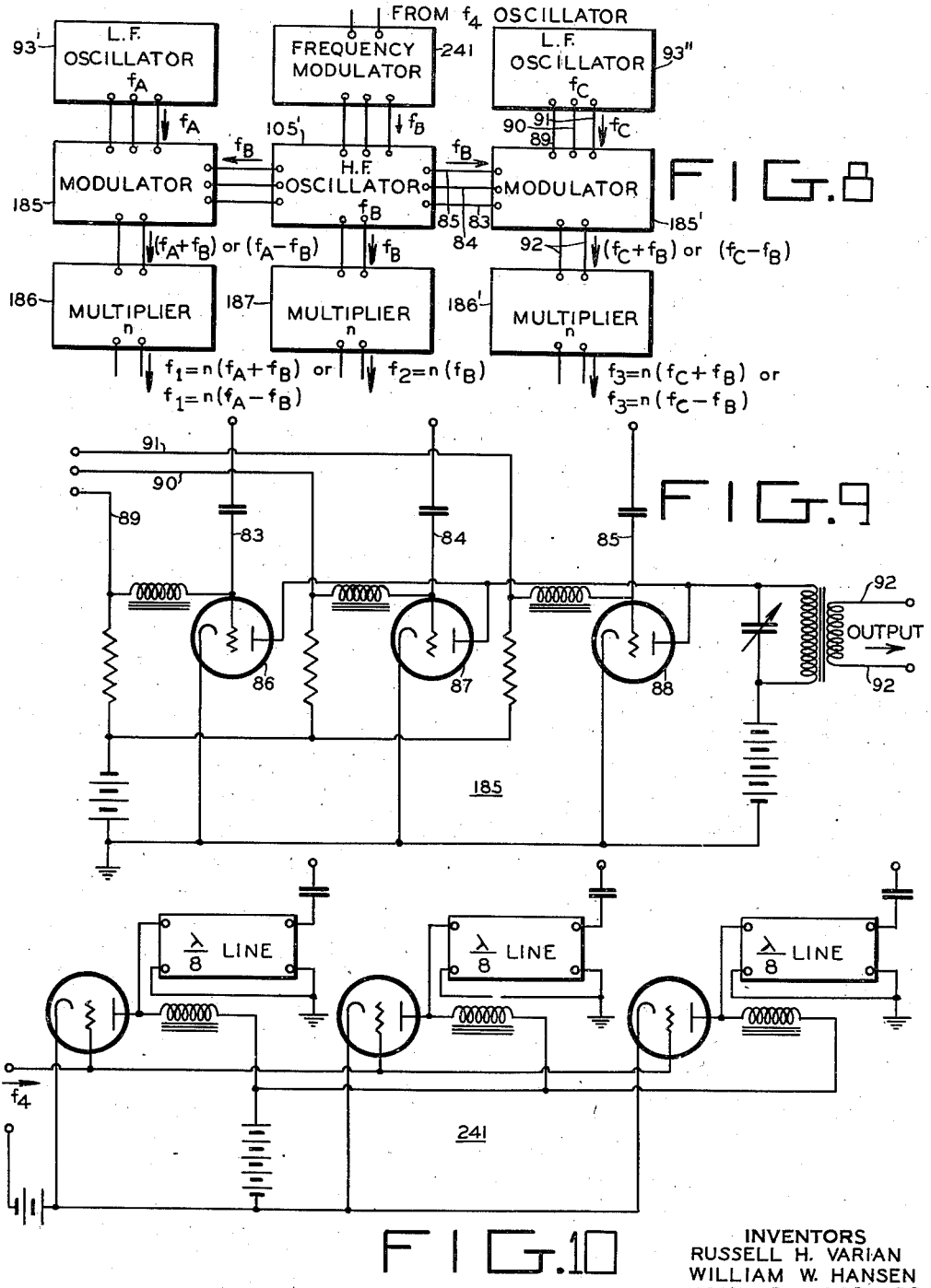

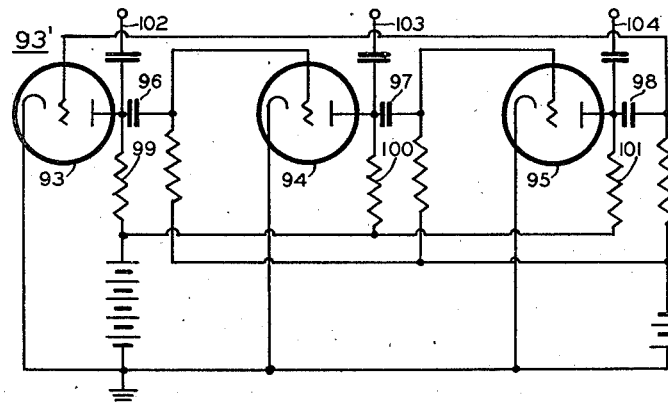
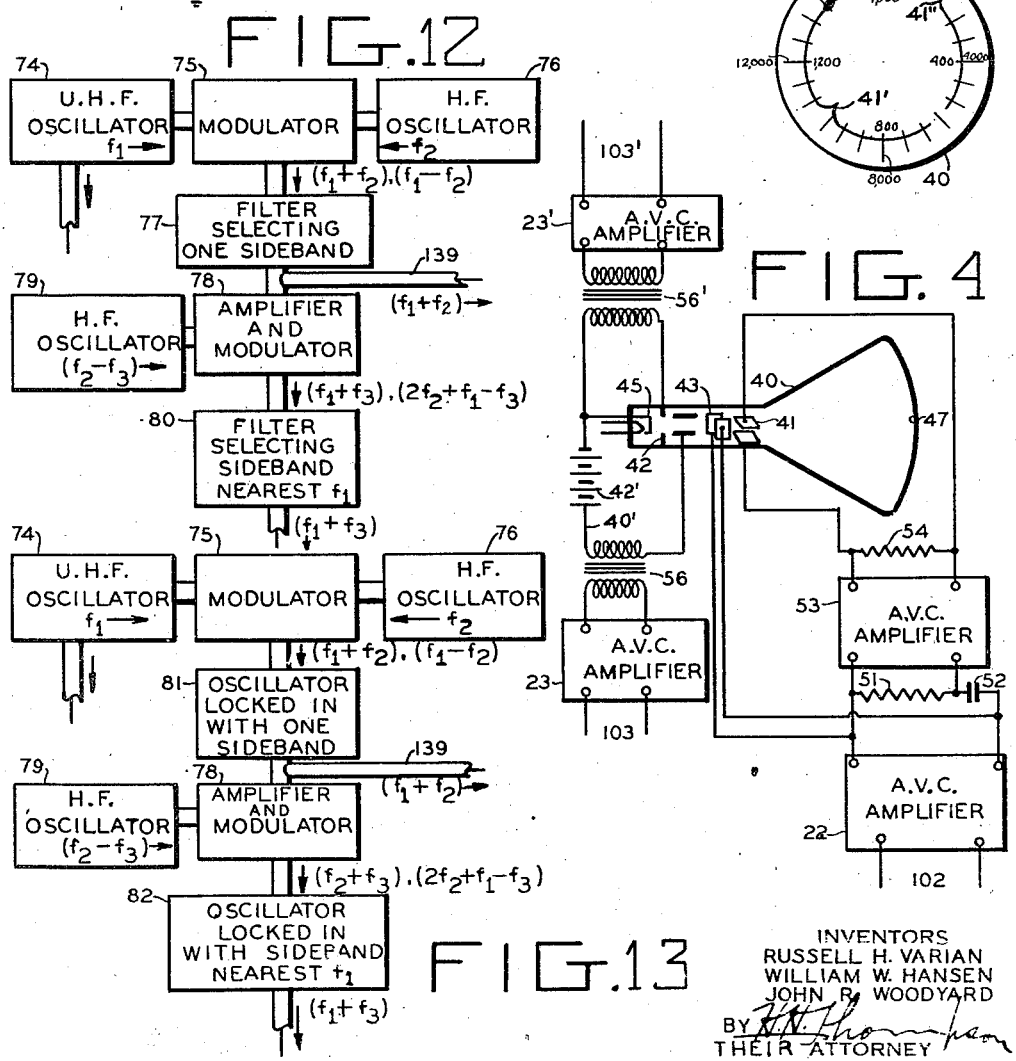

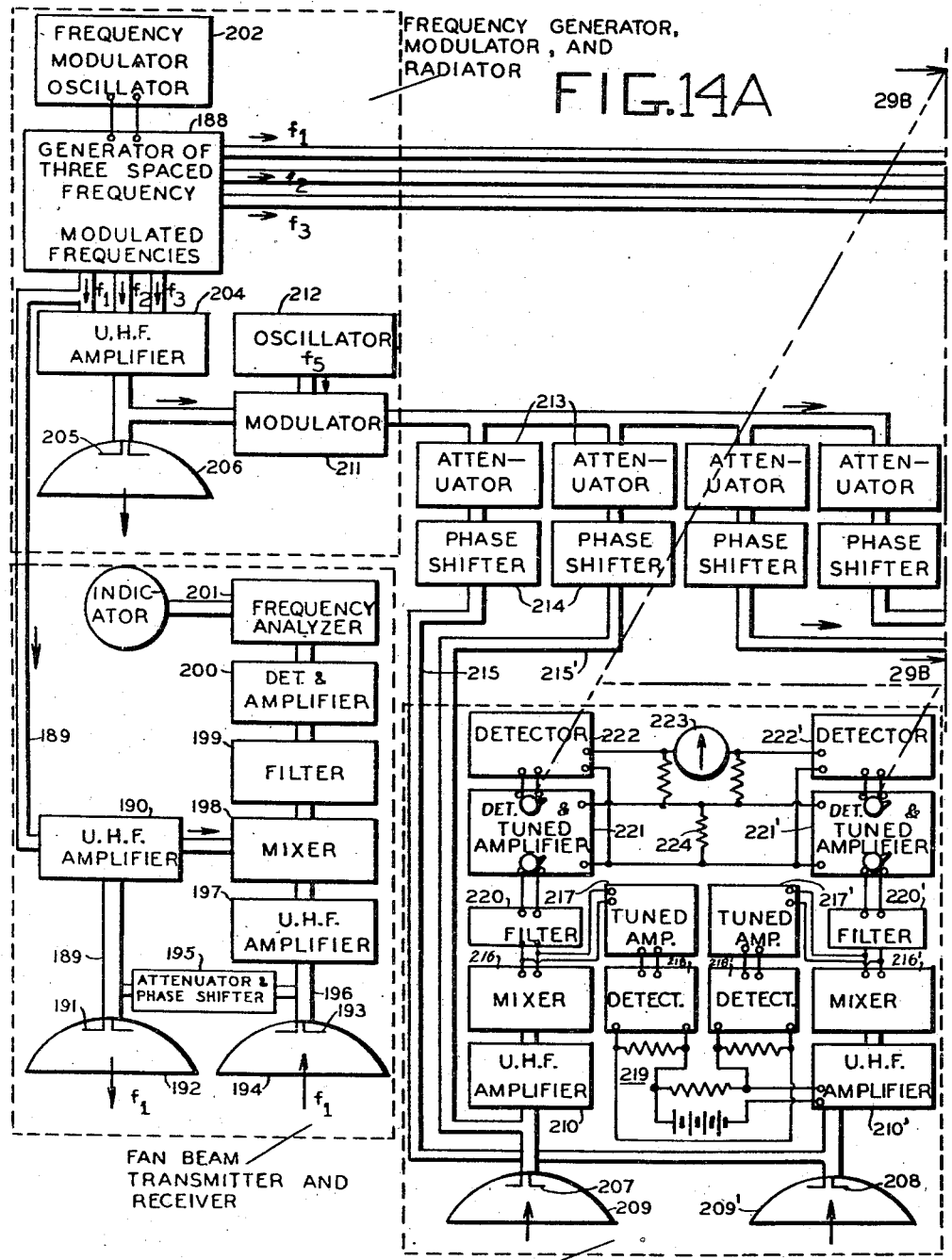

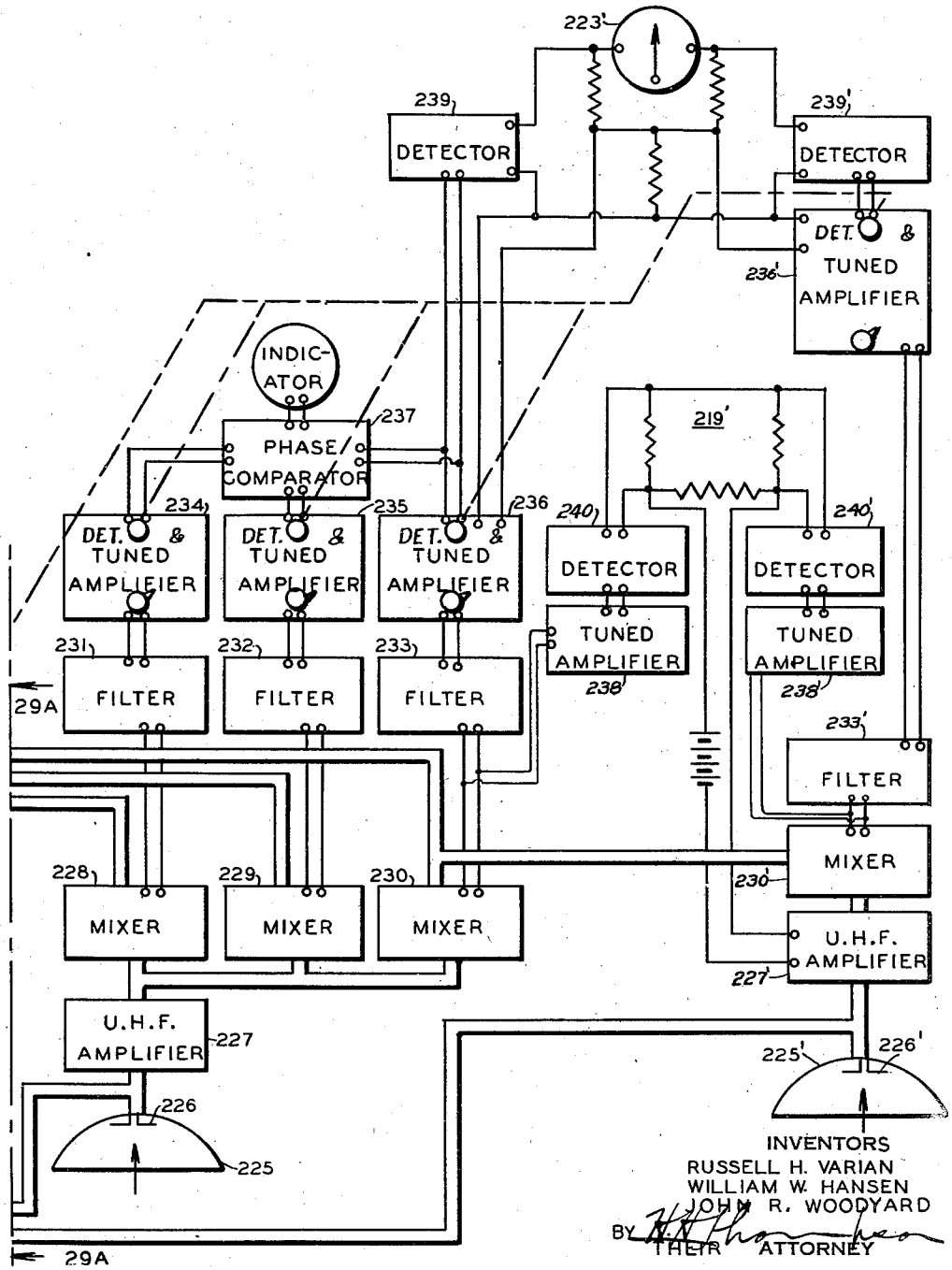

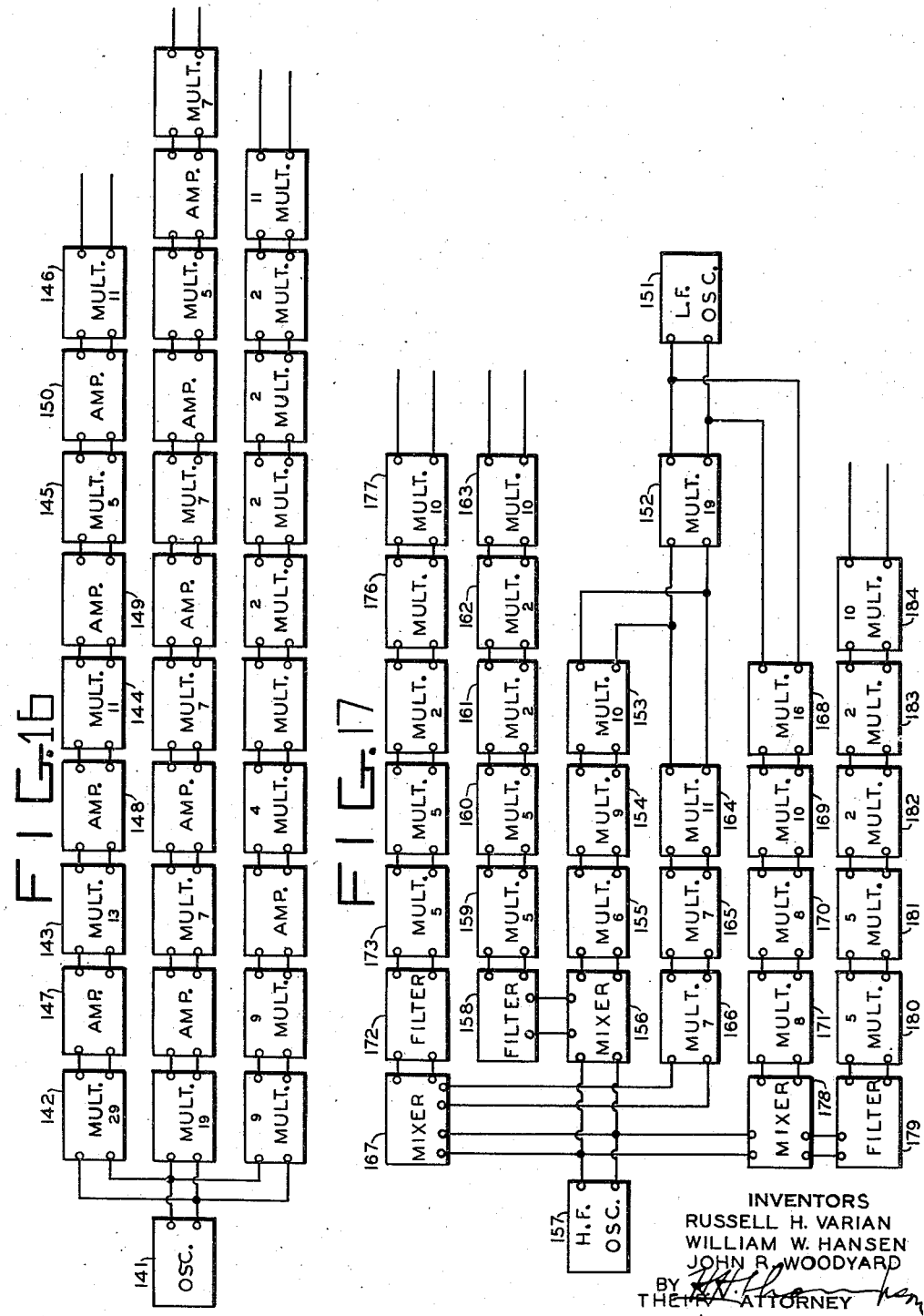

Feb. 10, 1948.  R. H. VARIAN ET AL  2,435,615
OBJECT DETECTING AND LOCATING SYSTEM
Filed Sept. 30, 1941  9 Sheets-Sheet 9
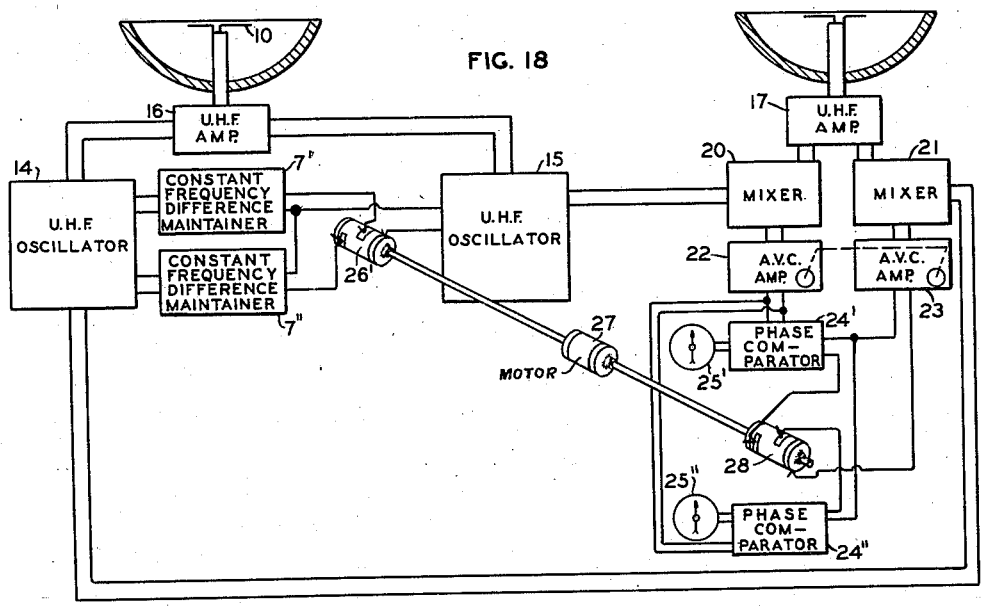
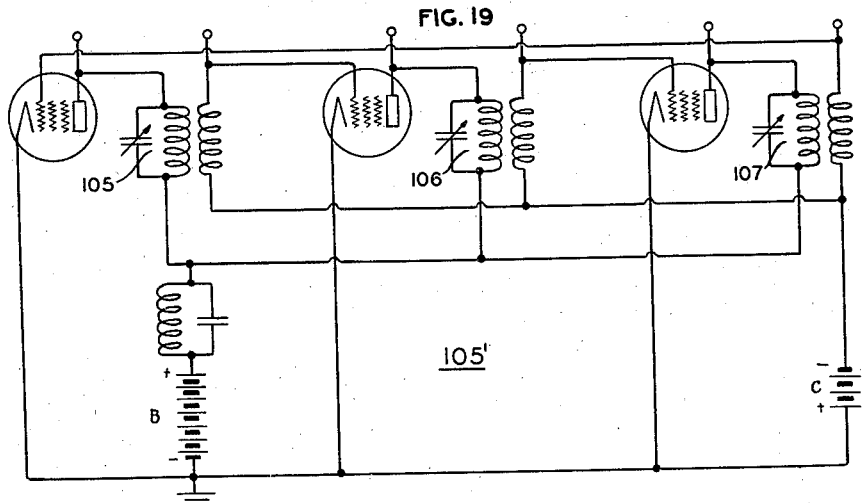
INVENTORS
RUSSELL H. VARIAN
WILLIAM W. HANSEN
BY  JOHN R. WOODYARD
Herbert H. Thompson
THEIR ATTORNEY Patented Feb. 10, 1948

2,435,615

UNITED STATES PATENT OFFICE 2,435,615

OBJECT DETECTING AND LOCATING SYSTEM

Russell H. Varian, Bellmore, and William W. Hansen and John R. Woodyard, Garden City, N. Y., assignors to The Board of Trustees of the Leland Stanford Junior University, Stanford University, Calif., a corporation of California Application September 30, 1941, Serial No. 412,918

18 Claims. (Cl. 250—1.58)

1

This invention relates, generally, to the detection and location of objects such as aerial targets and the invention has reference more particularly to a novel system for accomplishing this result. In Patent No. 2,415,094 issued February 4, 1947 for Radio measurement of distances and velocities by William W. Hansen and Russell H. Varian there is disclosed a system for determining the azimuthal and elevational positions of an object and for determining the radial velocity and the distance of the same.

The present application accomplishes results accomplished by the above-mentioned application but by different means and methods and in addition provides means for substantially limiting the signal produced by nearby reflecting objects thereby providing more sensitive reception and in addition greatly reducing the detrimental effects of microphonic noises and power supply disturbances.

One of the objects of the present invention is to provide a system for detecting and directly indicating the azimuthal elevational angles of a target or other object.

Another object of the present invention is to provide a system of the above character that directly indicates the slant range and radial velocity of a target or other object.

Still another object of the present invention is to provide a system for measuring the distance of objects which utilizes two or more slightly differing ultra-high frequencies which are directionally propagated and reflected from an object or target, the received reflected signals being mixed with the respective transmitted signals and the beat frequencies thus obtained compared as to phase for determining the exact distance of the target.

Still another object of the present invention is to provide means for reducing the disturbing effect of reflections from nearby objects while the direction of the projected beam is changing, or that produced by moving local objects while the beam is stationary, thereby cutting down in effect the background noise so as to render the apparatus more sensitive to target detection and location, the system of the present invention employing means for reducing the blanketing effect of noise over the signal to a minimum and incorporating means for reducing the effect of microphonic disturbances.

Another object of the present invention is to provide a distance indicating meter having coarse and fine scales that are simultaneously readable.

Still another object of the present invention is

2 to provide means for maintaining the two or more ultra-high frequencies used at a fixed frequency difference or differences.

Still another object is to provide means for tuning the distance measuring circuit in accordance with the beat frequency as determined by the velocity of a detected object.

Still a further object of the present invention is to provide apparatus for giving an alarm in the event that an approaching target passes through a prescribed distant region or zone.

Other objects and advantages will become apparent from the specification, taken in connection with the accompanying drawings wherein the invention is embodied in concrete form.

Fig. 1 is an elevational view of one form of the system of the present invention.

Fig. 2 is a schematic plan view of the structure of Fig. 1.

Fig. 3 is a wiring diagram of the structure of Fig. 1.

Fig. 4 is a wiring diagram showing the distance indicator and circuits therefor.

Fig. 5 is a detail elevational view showing means for affecting elevational scanning.

Fig. 6 illustrates a detail of antenna feed line construction.

Fig. 7 is a schematic diagram of the system employing three spaced frequencies and mechanical scanning.

Fig. 8 illustrates apparatus actuated for obtaining a plurality of frequencies.

Fig. 9 is a wiring diagram of a circuit for taking the sum or difference of two frequencies.

Fig. 10 is a wiring diagram of a three phase frequency modulator.

Fig. 11 is a wiring diagram of a low frequency three phase oscillator.

Figs. 12 and 13 are schematic views of apparatus for producing two ultra-high frequencies while maintaining a fixed frequency difference therebetween.

Figs. 14A and 14B illustrate a form of the system employing a null method of alignment of the receiving antenna means on the target.

Fig. 15 shows a tube face having typical coarse and fine distance markings thereon.

Figs. 16 and 17 are diagrams of apparatus for producing three ultra high frequencies having fixed frequency differences.

Fig. 18 shows a modification of the structure of Fig. 1.

Fig. 19 shows a form of high frequency oscillator.

Practical means for locating objects under conditions of poor visibility are vital to national defense and public safety. Any such means must depend for its operation upon radiations having a wave length which is long compared to the diameter of cloud particles preventing visual observation of the object in order to pass through clouds without being scattered. At the same time, if accurate observations of the position of target are to be made, it is also necessary that any beam projecting means should have a diameter great compared to the wave length of the radiations to be projected in order to give a sharply defined beam. Hence, the use of ordinary light is impossible because the wave length is too short. Further, long radio waves cannot be used because the directive apparatus used, being necessarily many wavelengths in diameter, would be unmanageably large. These two restrictions, therefore, confine the range of suitable wavelengths to a band extending from a few millimeters to perhaps 50 centimeters.

Referring now to Figs. 1, 2 and 3 there is diagrammatically illustrated one form of apparatus for measuring the distance of objects or targets, such as airplanes. The reference numerals 1 and 1' designate reflectors of transmitting and receiving means adapted to transmit and receive electromagnetic radiations of ultra-short wavelength, for instance, of a wavelength of the order of 9 centimeters. The reference numeral 2 designates a transmitter adapted to operate on a wave length of the order of 9 cm. and utilizes reflector 1, which may be of the parabolic type. The object or target at which the reflector is directed is designated by the reference numeral 4. The electromagnetic radiation transmitted from member 1 in the direction of the object 4 is indicated by the dot and dash line 5, whereas the adjoining dot and dash line 6 indicates the radiation reflected back from the object 4 to member 1'. The transmitter 2 may be of the type disclosed in Patent No. 2,406,370, issued August 27, 1946, for Electronic oscillator detector.

The transmitter 2 is adapted to supply two ultra high frequencies differing only slightly in wavelength from one another that are transmitted in the form of a beam by reflector 1. Depending upon the location of target 4, the respective reflected radio waves received by reflector 1' of receiver 3 will bear a definite phase relation with the respective transmitted waves.

Assuming that object or target 4 is moving, the distance from the reflector to the target will vary as a function of time. As the distance changes by a half wavelength of one of the transmitted frequencies, the total path from radiating antenna 10 to 4 and back to receive antenna 11 will change by approximately a whole wave length of such frequency. Assuming for purposes of illustration that the transmitter radiates radio beams of approximately 9 centimeters wavelength, then if the speed of the target is such that the distance between the apparatus and the target changes at the rate of 10 miles per hour, the shift of phase between one of the frequencies radiated by the transmitter and its reflection will be substantially at the rate of 100 cycles per second. For a relative speed between apparatus and target of 100 miles per hour, the beat frequency obtained by mixing one of the transmitted frequencies with its reflection will be approximately 1000 cycles per second.

As the moving target passes successively through points in space for which the distance from the transmitter to the center of reflection of the target is commensurate with one-half of the wavelength of the transmitted radio energy, the phase of the detected beat frequency will pass successively through identical values, and while the target moves from one such point to the next adjacent point, the phase of the beat undergoes a change of 360 degrees. Hence, it will be noted that the phase of the beat between transmitter output and the reflected signal bears a definite relation to the position of the center of reflection of the target.

Receiver 3 receives the reflected signal on the single antenna 11 from whence it is conveyed with or without amplification to two mixers where it is beat with one of the radiated frequencies in one mixer and with the other radiated frequency in the other mixer. For the example selected, where transmitter 2 transmits on two wavelengths of 9 centimeters and 9.000027 cm. respectively, the two wavelengths differ by 3 parts in a million, and hence in a distance of 333,333⅓ wavelengths there will be one more of the shorter waves than of the longer ones. As has been already shown, a moving reflecting object will cause a reflection capable of producing a beat frequency when mixed with the transmitted waves. If we imagine an object to start from transmitter 2 and move away to a distance 166,666⅔ wavelengths of the transmitted energy, thereby producing a total direct and reflected beam length of 333,333⅓ wavelengths, there will have been one more beat for the higher frequency than for the lower, and hence the phases of the two beats relative to each other will have been continuously shifting and the degree of the shift is a measure of the distance.

When the moving target is located very close to the transmitter and receiver, then the phase difference between the two beats within the receiver will be very small, since for the example chosen, the radiated wavelengths differ only by approximately 3 parts in a million. When the moving target is located at a distance from the transmitter and receiver corresponding to one-quarter wavelength of the frequency difference maintained between the two transmitted frequencies, i. e. 10,000 cycles in the illustrative example chosen, corresponding to a distance of 7,500 meters, the phase difference between the detected beats will be 180 degrees. For a moving target located at a distance corresponding to one-half wavelength of the frequency difference between the transmitted frequencies, the phase difference between the detected beats will be 360 degrees (for the selected example this distance is 15,000 meters). For intermediate distances between the reflector 1 and the target 4, the beat phase differences will be proportional to the distance. Therefore, in the example chosen, where a frequency difference of 10,000 cycles per second is maintained between the two frequencies in transmitter 2 a continuous change in phase relation will be obtained as the object moves through the 15,000 meter range.

In Fig. 3 transmitting antenna 10 is shown energized through a concentric line indicated at 12, whereas the receiving antenna 11 energizes a transmission line 13. Reflectors 1 and 1' are preferably so positioned relatively that there is little direct coupling therebetween, or the antennae 10 and 11 may be differently polarized, or both. Transmitter 2 comprises two ultrashort-wave oscillators 14 and 15 generating, for example, wavelengths of the order of 9 centimeters, and are maintained at a constant frequency difference, for example, of 10,000 cycles per second by means of the constant frequency difference maintainer 7, which may be of the type disclosed in Russell H. Varian et al., application Serial No. 366,358, filed Nov. 20, 1940, now Patent No. 2,294,942, issued September 8, 1942.

The outputs of oscillators 14 and 15 are shown fed into an amplifier 16 which energizes concentric line 12, and, therefore, sending antenna 10. Since both ultra high frequency beams of radio energy, maintained at a substantially constant frequency difference, are projected from the same antenna 10 and the reflected energy of both beams received by the same antenna 11 the total distances traveled by these beams is identical.

Electromagnetic energy reflected from target 4 is received by antenna 11 and passing through concentric line 13 is used to energize a high frequency amplifier 17, the output of which is directed into mixers 20 and 21. In mixer 20 the received signal is heterodyned with oscillator 15 and the detected low frequency directed into a low frequency amplifier 22 which may be provided with automatic volume control. In mixer 21, the received signal is heterodyned with oscillator 14 and the detected low frequency directed into a low frequency amplifier 23 similar to amplifier 22.

Making use of the principle of superposition for the purpose of analysis, it can be shown that the results described in connection with Fig. 1 are also realized in connection with Fig. 3. Antenna 10 may be considered as radiating independently two frequencies maintained at a constant frequency difference apart, say 10,000 cycles. Let $f_1$ be the lower frequency and $f_2$ the higher frequency, and let $f_2-f_1$ equal 10,000 cycles. Assume that the target 4 approaches transmitter 1 at 100 miles per hour. Due to reflection from the target, antenna 11 will receive frequencies of $f_1$ plus 1000 cycles and $f_2$ plus 1000 cycles. However, due to residual direct coupling, antenna 11 will also receive energy at frequencies $f_1$ and $f_2$. The radio energy received by antenna 11 is amplified in high frequency amplifier 17, the output of which is fed into mixers 20 and 21 and contains the four frequencies $f_1$, $f_2$, $f_1+1000$ cycles, and $f_2+1000$ cycles. In mixer 20, these frequencies are heterodyned with the output of oscillator 15, which may be considered to be $f_1$. The low frequency output of mixer 20 fed into low frequency amplifier 22 will contain low frequency components of 10,000 cycles due to heterodyning between $f_1$ and $f_2$, 11,000 cycles from $f_1$ and $f_2+1000$ cycles, 9000 cycles derived from $f_1+1000$ cycles and $f_2$ but this can be made weak, 1,000 cycles from $f_2$ and $f_2+1000$ cycles, and 1,000 cycles due to heterodyning $f_1+1000$ cycles and $f_1$. The 1,000 cycle component derived from $f_1$ can be made very large compared to the 1,000 cycle component derived from $f_2$ by making the input of $f_1$ energy from oscillator 15 into mixer 20 large compared to the $f_2$ energy derived by direct coupling between antennae 10 and 11. Hence, the output of low frequency amplifier 22 has a frequency of 1,000 cycles the phase of which is determined by the distance of the center of reflection of target 4 to the apparatus with respect to the frequency $f_1$.

Similarly, in mixer 21 the 1,000 cycle component derived from $f_2$ can be made very large compared to the 1,000 cycle component derived from $f_1$ by making the input energy of $f_2$ from oscillator 14 into mixer 21 large compared to the $f_1$ energy derived by direct coupling between antennae 10 and 11. Hence, the output of low frequency amplifier 23 has a frequency of 1,000 cycles, the phase of which is determined by the distance of the center of reflection of target 4 to the apparatus 1 and is different from the phase of the thousand cycle frequency in amplifier 22, the difference depending on the distance of object 4.

The low frequency amplifiers 22 and 23 are so designed as to suppress the frequencies 9,000, 10,000 and 11,000 cycles. The phase angle between the beat frequencies obtained from frequencies $f_1$ and $f_2$ can then be determined by the apparatus of Fig. 4 to be described.

To obtain a scale for indicating the change in phase relation between the beat output of amplifiers 22 and 23 the means indicated in Fig. 4 may be used, wherein a cathode ray oscillograph 40 is shown, having a pair of horizontal deflecting plates 41, and a pair of vertical deflecting plates 43. An electron gun is indicated at 45 for projecting a stream of electrons against a fluorescent screen 47, the stream of electrons passing between the two pairs of deflecting plates.

The beat output from amplifier 22 is impressed upon the pair of horizontal deflecting plates 43 to give a horizontal deflection of the electron stream in cathode ray tube 40. The output of amplifier 22 is also impressed upon a resistance 51 and a condenser 52 in series, the reactance of condenser 52 being large compared to the resistance of 51 for the desired range of frequencies. Under these conditions the voltage drop across resistor 51 will be substantially at right angles to the voltage output of amplifier 22. The voltage developed across resistance 51 is introduced into an amplifier 53 which may be equipped with automatic volume control, and the output potential of amplifier 53 is impressed across a resistance 54 and upon the vertical deflecting plates 41 of cathode ray tube 40, which potential, being 90° out of phase with that applied to the horizontal deflecting plates, produces a circular trace of the cathode-ray-beam on the face 47 of tube 40.

The beat output obtained from amplifier 23 is impressed upon an impulse generator 56. This impulse generator may consist of a transformer operated at very large flux densities resulting in a highly saturated core, so that a sharp pulse of voltage will be generated in the transformer secondary each time the primary current passes through zero. Impulse generator 56 will produce two impulses per cycle which may be impressed upon cathode 45 of cathode ray tube 40 via lead 40' and accelerating battery 42'. One of these impulses will increase the voltage impressed on cathode 45, increasing the speed of the electrons in the stream, consequently decreasing the deflection of such electrons while passing through the two pairs of deflecting plates, thus producing an inwardly projecting nick, dent or cusp 41' in the circle appearing on fluorescent screen 47. The other impulse will decrease the voltage impressed on cathode 45, decreasing the speed of the electrons in the stream, resulting in an increased electron deflection while the stream passes through the deflecting plates, and producing an outwardly projecting cusp or bulge 41 upon the circular trace appearing upon the fluorescent screen. Either of these indications taking place once per cycle may be used to indicate the phase difference between the beat frequencies obtained from amplifiers 22 and 23 with reference to the indications obtained for zero phase difference, and in this manner indicate the distance of the reflecting target producing such beat frequencies. If desired, the fluorescent screen of tube 40 may be provided with a direct reading scale calibrated to indicate distances as shown in Fig. 15. If desired, the output of mixer 21 may be supplied through leads 103′, amplifier 23′ and impulse generator 56′ to control grid 42 of tube 40, thus producing one bright spot and one faint spot upon screen 47 per cycle of the modulation frequency introduced at leads 103′, instead of the nicks used as illustration above.

The radial speed of the target 4 is shown directly by a meter 29 of the frequency measuring type, in Fig. 3, which meter is connected to amplifier 22, for example, and measures the beat frequency between one of the transmitted frequencies and its reflection from the target.

If desired, the antenna feed lines such as line 12 may be provided with means for preventing current flow on the exterior surface of the line outer conductor, the presence of which current causes scattering of the emitted radiation. This means comprises a plurality of approximately quarter wave length concentric line resonators 31 having the exterior conductor of line 12, for example, as their inner conductor. Each resonator acts as a lumped impedance to the flow of current and these resonators may be spaced a quarter wave length apart or less. Thus, in Fig. 6 these resonators are shown less than a quarter wave length apart, thereby shortening the distance measured in wave lengths between the successive impedances. Any radiation impinging on the outside of the line is affected as though the line were broken at a plurality of points.

Referring now more particularly to Figs. 1 and 2, the transmitting and receiving reflectors 1 and 1′ are arranged to scan a desired field of view. Azimuthal scanning is accomplished by use of a motor 8 operating a crank disc 9 connected through spring link 30 to oscillate a bar 32 pivoted at 33. Bar 32 is connected by links 34, 34′ to oscillate levers 35, 35′ provided on reflectors 1 and 1′. Springs 36 and 36′ acting together with springs 37, 37′ and 38, 38′ tend to hold the reflectors 1 and 1′ in a desired direction, which is shown in Fig. 2 as tending to aim these reflectors directly ahead. These springs also serve to return these reflectors to this ahead position when the actuating force provided by link 30 is released. Thus, as crank disc 9 turns the bar 32, the connected reflectors 1 and 1′ will be given a simple harmonic motion. The tension of the springs 36, 36′, 37, 37′ and 38, 38′ being so adjusted with respect to the mass of the system that a condition of mechanical resonance exists thereby greatly reducing the power necessary to operate the system. A type of system somewhat similar to this is disclosed in copending application of Joseph Lyman et al., Serial No. 406,494, filed August 12, 1941. However, the present invention goes further than the Lyman application in that means are provided for also greatly reducing or substantially eliminating vibration of the system, i. e., of the supporting platform 39 and connected parts. This is accomplished by providing weights 49 and 49′ on the bar 32 on opposite sides of the pivot 33. It will be noted that when the bar 32 and attached weights are moving clockwise the reflectors 1 and 1′ are moving counterclockwise so that the momentum of bar 32 and connected weights serves to counterbalance the momentum of the reflectors 1 and 1′ and connected parts, whereby there is no vibrating torque applied to the base 39 so that this base does not vibrate as it would do otherwise.

Elevational movement of the reflectors is shown in Fig. 5 accomplished by use of solenoids 57 acting through linkage 58 to oscillate the reflectors about their horizontal axis 59 in the manner described in the above mentioned Lyman et al. application. Means are also shown in Fig. 5 for compensating the vertical angular momentum of the reflectors by use of weights 60 and 60′ mounted on a rod 61 and carried by pinion 62 driven by gear 63 fixed on the pivot 59 so that as this pivot turns in one direction the weights 60 and 60′ are revolved in a reverse direction thereby compensating for the vertical angular momentum of the reflector 1 or 1′ as the case may be.

In order to provide an indication of the azimuthal and elevational angles of the target 4 suitable pick-offs are provided in connection with one of the reflectors 1 and 1′. Thus, in Fig. 2 a potentiometer arm 64 is actuated from link 32 which arm moves over a potentiometer 65 connected in the manner disclosed in the above mentioned Lyman application for varying the deflecting potentials on the horizontal deflected plates of a cathode ray tube 69, illustrated in Fig. 3, to effect scanning movements of the cathode ray beam were the same on. Potentiometer 65 is also shown schematically in Fig. 3 and is energized from a battery 66. Vertical scanning movements of the reflectors 1 and 1′ are transmitted through linkage to a potentiometer arm 67 (see Figs. 3 and 5), which arm moves over a potentiometer 68 also energized from battery 66 and connected to the vertical deflecting plates of the cathode ray tube 69.

The output of mixer 21 is also shown connected by leads 70 through an amplifier 71 to the control grid 72 of the cathode ray tube 69. The tube 69 is biased off by a battery 73 so that while deflecting potentials are applied to the deflecting plates of this tube no beam is actually actuated thereby until the maximum signal is received by the antenna 11 whereupon the output of mixer 21 reaches a point sufficient to bias the tube 69 on to produce a spot on the face of this tube corresponding in angular position to the azimuthal and elevational angles of the target. This face of tube 69 may be provided with a scale as shown in the above Lyman application for indicating directly the angular position of the target. Thus, the present system so far described has provided means for determining the distance, the radial speed and angular position of the target.

If the frequency difference maintained between the two outputs of transmitter 2 is made 100,000 cycles per second instead of 10,000 cycles per second, then one-half wave length of this frequency difference corresponds to a relative distance between the apparatus and target 4 of 1,500 meters. Thus, every successive 1,500 meter change in relative distance between the transmitter-receiver 2, 3 and the object results in a 360 degrees phase shift between the beat frequencies produced in mixers 20 and 21, and if the target is at a greater distance than the initial 1500 meter range from the apparatus, then in that case the phase indicator will only indicate the fraction of 1500 meters that is included in the distance between apparatus and target, so that the distance measurement will be ambiguous as to the whole number of times 1500 meters is contained in this distance.

However, by operating transmitter 2 alternately first at two frequencies differing by 10,000 cycles and then at two frequencies differing by 100,000 cycles and by using receiver 3 to heterodyne alternately these pairs of frequencies with their reflections, this distance ambiguity may be overcome. The first or coarse phase comparison will indicate the number of times 1500 meters is contained in the distance from the apparatus to the target, while the alternate fine phase comparison will indicate the fraction of 1500 meters contained in this distance, so that a very accurate distance measurement is obtained by such a combined reading. In order to distinguish the coarse reading from the fine reading, suitable switching means is employed as is illustrated in Fig. 18. In this figure two frequency difference maintainers 7' and 7'' are employed and a pair of phase comparators 24' and 24'' are employed together with commutating means for alternately connecting the two constant frequency difference maintainers between the oscillators 14 and 15, whereby the transmitter is caused to alternately transmit different pairs of frequencies, the frequencies of one such pair differing by 10,000 cycles, for example, and the frequencies of the other pair differing by 100,000 cycles, for example. This commutating means comprises a commutator 26 driven by motor 27 that also drives a commutator 28 for alternately connecting the output of amplifier 23 to the two phase comparators 24' and 24'', whereby the meters 25' and 25'' fed from these comparators are caused to respectively indicate coarse and fine distances since phase comparator 24' compares the phase of the beats produced by mixing the respective transmitted signals of the pair of frequencies having the 10,000 cycle frequency difference with their respective reflections, whereas phase comparator 24'' compares the phase of the beats produced by mixing the respective transmitted signals of the other pair of frequencies having the 100,000 cycle frequency difference with their respective reflections.

If desired, the outputs of amplifiers 22 and 23 can be supplied to a cathode ray indicator as in Fig. 4. In such cases, the output of amplifier 22 can be supplied to the deflecting plates 41 and 43 of tube 40 in 90° out of phase relation, and the commutator 28 is used to alternately supply the output of amplifier 23 to impulse generators 56 and 56' whereby the cusp and spot indications will constitute coarse and fine distance measurements.

It is obvious that two perfectly pure frequencies could be, at least in principle, compared as to phase to any degree of accuracy desired, but if the frequencies to be compared are not pure, this is not true. In practice, the frequencies to be compared contain a noise component such as the thermal noise present in all electric circuits including shot effect noise, or other sources of disturbance, and the strength of this noise component relative to the frequencies to be compared and the time interval allowable in making the comparison determines the degree of accuracy of phase comparison which is possible. The noise may be considered as a wave which is superimposed on the waves being compared as to phase. The error in phase caused by the noise is proportional to the ratio of the amplitude of the noise relative to the signals compared but the energy of the noise relative to the signals is proportional to the square of this ratio. Therefore, if it is desired to measure the phase difference of the signals to ten times a given accuracy, the ratio of signal energy to noise energy must be increased a hundred fold. Therefore, by providing coarse and fine scales which individually do not require accurate phase comparison, nevertheless in combination provide increased accuracy and range.

In order to obtain accurate measurement of distances, it is essential that a fixed frequency difference be maintained between the two or more frequencies emitted from the transmitter. This may be accomplished by use of apparatus disclosed in Patent No. 2,294,942 of Russell H. Varian et al. for Fixed frequency difference stabilization system issued September 8, 1942. Other means for maintaining the desired fixed frequency differences are illustrated in Figs. 12 and 13. In Fig. 12 an ultra high frequency oscillator 74 as of the type disclosed in Patent No. 2,242,275 has its output supplied to a modulator 75 to which is also supplied the output of a high frequency oscillator 76. Thus, if the frequency of the ultra high frequency oscillator is $f_1$ and that of the high frequency oscillator is $f_2$, the output of the modulator will then be $f_1+f_2$ and $f_1-f_2$. Actually, the frequency of the oscillator 74 may be of the order of $3\times10^9$ and the frequency of the oscillator 76 may be of the order of $10^6$ cycles. The output of modulator 75 is filtered by filter 77 which selects one side band, for example, $f_1+f_2$ and supplies this side band to an amplifier and modulator 78 to which is also connected the output of a high frequency oscillator 79 whose frequency is designated as $f_2-f_3$ where $f_3$ is of the order of 10,000 cycles, for example, then the output of the modulator 78 will be $f_1+f_3$ and $2f_2+f_1-f_3$. A filter 80 is then used to select the side band which is closest to $f_1$ i. e., $f_1+f_3$ so that the output of the apparatus of Fig. 12 is $f_1$ from oscillator 74 and $f_1+f_3$ from filter 80 and these two frequencies are supplied to the transmitter antenna 10. Inasmuch as the frequency difference which is maintained is derived from oscillators 76 and 79 which are in the ordinary radio range and can be maintained with very high frequency stability the difference frequency $f_3$ will be very stable so that the two frequency outputs of the apparatus of Fig. 12 are maintained with substantially unvarying frequency difference.

In the form of the apparatus shown in Fig. 13, instead of using the filter 77, an oscillator 81 is employed which is locked into step with the desired side band such, for example, as $f_1+f_2$. In effect, this oscillator takes the place of the filter 77 Fig. 12. Also an oscillator 82 is used in lieu of filter 80, otherwise these structures are similar.

Still another way of obtaining two ultra high frequencies having a fixed slight frequency difference therebetween is illustrated in Fig. 9 of the drawings. In this figure, high frequency three phase current is supplied through leads 83 to 85 to the grids of triodes 86 to 88. The grids of these tubes are also supplied with low frequency three phase current over leads 89 to 91. Thus, for example, if the frequency supplied over leads 83 to 85 is of the order of $10^7$ cycles per second, and the frequency supplied over leads 89 to 91 is 33.3 cycles per second, the latter three phase current being supplied at a higher potential than the ultra high frequency three phase current so as to change the mutual conductance of the valves 86 to 88 in accordance with the applied low frequency potential. This low frequency potential will therefore cause the tubes to pass current in succession, whereby the output circuit 92 shifts in phase continuously at the rate of one cycle every 1/33.3 fraction of a second, hence the frequency output of leads 92 will have a value, for instance $10^7$ cycles per second plus 33.3 cycles or $10^7-33.3$, thus obtaining the sum or difference of the two input frequencies depending upon in which manner the phases are connected. This frequency output supplied over leads 92 may now be multiplied by multiplier circuits to an ultra high frequency value such as $3\times10^9$ cycles.

The low three-phase frequency supplied through leads 89 to 91 may be furnished by an oscillator 93' of the type shown in Fig. 11 of the drawings. This oscillator comprises three tubes 93 to 95, shown as resistance coupled and having condensers 96 to 98 and resistances 99 to 101 so proportioned relatively that a 120° phase shift is obtained between each successive pair of tubes at the desired operating frequency, noting that tube 93 is coupled to tube 94, which in turn is coupled to 95 that is back coupled to 93. Hence, output leads 102 to 104 will supply three phase current.

A high frequency oscillator 105' for supplying current to leads 83 to 85 of Fig. 9 is illustrated in Fig. 19. This oscillator is similar to that of Fig. 11 except that resonant circuits 105 to 107 are employed in lieu of resistance coupling, the 120° phase shift between tubes at the desired frequency being obtained by the adjustment of these circuits.

An alternative arrangement to the operation of transmitter 2 alternately at two distinct pairs of frequencies would be to provide for radiation of three frequencies from 2, and providing for heterodyning these three frequencies separately with their reflections in receiver 3.

Fig. 8 illustrates a means for obtaining three slightly spaced frequencies. This figure uses the high frequency oscillator 105' of Fig. 19 and the low frequency oscillator 93' of Fig. 11 together with the modulator 185 of Fig. 9. In Fig. 8 two low frequency oscillators 93' and 93'' of different frequencies are used in conjunction with two modulators 185 and 185' to produce two high frequencies, for example, $f_A+f_B$ and $f_C+f_B$ which frequencies are then suitably multiplied by multipliers 186 and 186' to produce two ultra high frequency outputs of slightly different frequency, and the third frequency is supplied by multiplying $f_B$ from oscillator 105' in a multiplier 187.

In the system of Fig. 7 instead of alternately transmitting two different frequencies to obtain a coarse and fine distance indication, three slightly different frequencies are transmitted continuously. These frequencies $f_1$, $f_2$ and $f_3$ which may be of the order of $3\times10^9$, $3\times10^9$ + or − 10,000, and $3\times10^9$ + or − 100,000 are supplied from a three phase generator 108 to an amplifier 109, the output of which is supplied through an impedance matching transformer of the type disclosed in Patent No. 2,406,372, issued August 27, 1946, to a transmitter antenna 110 contained in the reflector 111.

Thus, amplified versions of the three frequencies $f_1$, $f_2$ and $f_3$, are directionally transmitted from antenna 110 and reflector 111, which reflector is caused to universally scan a desired field of view in a manner disclosed in Patent No. 2,231,929, to Joseph Lyman. These three frequencies, after reflection from the remote object or target, are received by a receiving antenna 112 contained within a reflector 113 which are caused to universally scan a desired field of view synchronously with the scanning movements of antenna 110 and reflector 111. The received signals differing from the transmitted signals by any Doppler frequency introduced by the motion of the target present, are supplied through an impedance matching transformer 114 to an ultra high frequency amplifier 115, which amplifies all three frequencies and supplies its output to three mixers 116, 117 and 118.

In order to reduce the direct coupling between antenna 110 and antenna 112 to as low a value as possible, an impedance matching transformer 119 is connected between antenna 110 and antenna 112, this transformer being so adjusted as to substantially neutralize the effect of this direct radiation. Mixer 116 is also supplied with frequency $f_3$ over line 120 from the generator 108 so that the output of this mixer will contain one component substantially equal to $f_1$+the Doppler shift $-f_3$, and an amplifier 121 tuned to this frequency is used for amplifying this component of the output of mixer 116. After amplification, this component is supplied to mixer 122 which is also supplied over leads 123 with pure $f_1-f_3$ from a mixer 124, fed from two outputs of generator 108. Thus, mixer 122 will contain a low frequency output component which is numerically equal to the Doppler shift in frequency, which frequency is picked up by the filter 125 and passed on to a tuned amplifier 126, the output of which is supplied to a phase comparator 127.

The output of filter 125 is also supplied through an amplifier 128 and thence to frequency meter 129 similar to meter 29 of Fig. 3, which meter serves to directly indicate the radial speed of the target.

Mixer 117 mixes $f_3$ supplied from generator 108 directly with the $f_2$+the Doppler frequency shift component of $f_2$ fed from amplifier 115 resulting in a component consisting of $f_2$+the Doppler frequency shift $-f_3$ which is received by amplifier 130 and after amplification is supplied to mixer 131 which is also supplied with $f_2-f_3$ from the mixer 132 connected directly to the $f_2-f_3$ outputs of generator 108. As the results of comparing $f_2-f_3$ and $f_2$+the Doppler frequency shift $-f_3$ in mixer 131 the Doppler frequency shift of $f_2$ is obtained and is picked up by a filter 133 and then amplified by amplifier 134, which in turn supplies this output to phase comparator 127.

Similarly, mixer 118 mixes pure $f_1$ supplied from generator 108 with the $f_3$+the Doppler frequency shift output of amplifier 115 and passes this combination to amplifier 135 which after amplifying this combination frequency passes the same to mixer 136 that is also supplied with $f_1-f_3$ from mixer 124 so that the net output of mixer 136 is the Doppler frequency shift of $f_3$ which is passed through a filter 137 to a tuned amplifier 138 and from thence to the phase comparator 127. This phase comparator may be of the type shown in Fig. 4 wherein one frequency may be used for scanning purposes and supplied through leads 102. Thus, for example, the Doppler frequency shift of $f_1$ may be supplied from 126 to leads 102 and employed for producing a circular sweep of the cathode ray beam. Then the Doppler frequency shift of $f_2$ supplied from amplifier 134 may be supplied over leads 103, for example, to the saturated transformer 56 for controlling the accelerating potential on the electrons to produce a cusp at the proper position comparing the phase of $\Delta f_1$, i. e., the Doppler frequency of $f_1$ with $\Delta f_2$, i. e., the Doppler frequency of $f_2$. Similarly, by supplying the output of amplifier 138 over leads 103' for controlling the potentials of grid 42, bright and dark spots are produced on the face of tube 40 for indicating the phase difference between $\Delta f_1$, i. e., the Doppler frequency shift of $f_1$ and $\Delta f_3$, i. e, the Doppler frequency shift of $f_3$. Since the frequency difference between $f_1$ and $f_3$ is ten times the frequency difference between $f_1$ and $f_2$, the phase as indicated by the spot changes ten times as rapidly as a function of the distance of the object or target as the phase indicated by the cusp, so that coarse and fine indications are produced as before, thereby enabling a very accurate reading of the distance.

It will be noted that $f_1-f_3$ and $f_2-f_3$ are of the order of 100,000 cycles. This gives intermediate frequency amplifications at a frequency of the order of 100,000 cycles which is very desirable because it eliminates troubles due to microphonic noises and hums which would be difficult to eliminate if the amplification was performed at the Doppler frequency difference. Hence the value of this system over direct Doppler amplification is apparent.

The ultra high frequency generator 108 may be of the type disclosed in Fig. 12, the third frequency being obtained by duplicating the equipment below filter 77, i. e., using an oscillator 79' (not shown) of different frequency from 79 for feeding a modulator supplied with $f_1+f_2$ through line 139. Then the selected side band nearest to $f_1$ would be the third frequency used.

The generator 108 may also be of other types such as those using a low frequency oscillator together with suitable frequency multiplication. Such a generator as shown in Fig. 16, wherein a low frequency oscillator 141 has its output connected for supplying three multiplying strings, one of these strings consisting of multipliers 142 to 146 interconnected by alternate amplifiers 147 to 150. If desired, some or all of these amplifiers may be omitted. Thus, for example, the oscillator 141 may have a frequency of 15,000 cycles in which case the multipliers may have the frequency multiplication factors as designated thereon.

The second string of multipliers also employs alternate amplifiers and here again a typical series of multiplication factors is marked on the multipliers.

Similarly, a third string of multipliers may have amplifiers interspersed therewith and for a given example, the multipliers in this string may have the multiplying values given thereon. The net result is that three ultra high frequencies are produced at the right end of the figure having a frequency difference between two of these strings of the order of 100,000 cycles and a frequency difference between one of these two and the remaining string of the order of 10,000 cycles.

Still another means of obtaining three frequencies is illustrated in Fig. 17 where the output of a low frequency oscillator 151 as multiplied by multipliers 152 to 155 is mixed in a mixer 156 with the output of a high frequency, preferably crystal controlled, oscillator 157. Thus, for example, the low frequency oscillator may produce 15,000 cycles which is multiplied by the multiplication factors marked on the various multipliers and mixed with the output of the oscillator 157 which may have a frequency of 2,846,400 cycles. The sum frequency output of mixer 156 after filtering by filter 158 is multiplied by a series of multipliers 159 to 163, preferably having the multiplication values shown producing a net ultra high frequency output of the order of $3 \times 10^9$ cycles per second.

The output of multiplier 152 is also supplied through a series of multipliers 164 to 166 whereupon the resultant output is mixed in a mixer 167 with the output of high frequency oscillator 157 and their sum after filtering by filter 172 is multiplied by a chain of multipliers 173 to 177 producing an ultra high frequency having a suitable frequency difference with the output of multiplier 163. Similarly, the output of oscillator 151 is supplied through a series of multipliers 168 through 171 as of the values shown, whereupon the resultant output is mixed in a mixer 178, with the output of high frequency oscillator 157 and their sum, after filtering by filter 179, is multiplied by a chain of multipliers 180 to 184, producing an ultra high frequency having a frequency difference with the output of multiplier 163 that is preferably a multiple of the frequency difference between the outputs of 163 and 177. Thus the desired three frequencies are obtained.

The system illustrated in Figs. 14A and 14B employs three frequencies $f_1$, $f_2$, and $f_3$ supplied from a generator 188 which may be any of the types heretofore disclosed. A frequency modulating oscillator 202 is employed in connection with generator 188 to frequency modulate the three outputs of generator 188 at a desired frequency such as, for example, 10,000 cycles per second. One output frequency of this generator, for example, $f_1$ as frequency modulated by the 10,000 cycle frequency, is supplied through line 189 and an amplifier 190, which may or may not be used, to a directive antenna arrangement including the dipole 191 and fan beam projector 192. The produced electromagnetic fan beam after reflection from the remote object is received by a receiver antenna 193 having a fan beam receiving reflector 194. Reflectors 192 and 194 are adapted to be moved in synchronism in the manner disclosed in copending application 185,382, filed January 17, 1938, Patent No. 2,415,094 granted February 4, 1947, for Radio measurement of distances and velocities, the inventors being two of the inventors hereof, William W. Hansen and Russell H. Varian.

An attenuator and phase shifter 195 is interconnected between line 189 and the output line 196 of receiving antenna 193 for the purpose of counteracting the direct transmission between antenna 191 and antenna 193. The reflected signal energy received by antenna 193 is supplied to an ultra high frequency amplifier 197 and from thence it is passed to a mixer 198 wherein the received frequency modulated carrier, as shifted by the Doppler effect, is mixed with the generated frequency modulated carrier as supplied from amplifier 190. The net result is that the output of mixer 198 contains the fundamental and harmonics of the frequency of oscillator 202 modulated by the Doppler frequency which is passed to a detector and amplifier 200 which detects the Doppler frequency and supplies it to a frequency analyzer and indicator 201, which serves to indicate the radial speed of the target or object scanned. By frequency modulating the transmitted signals, the sensitivity of the system to near-by objects is decreased, as will further appear, so that the system does not pick up nearby moving objects such as birds, etc., and hence the tendency to give false indications is greatly reduced.

The three carrier frequencies $f_1$, $f_2$ and $f_3$ as modulated by oscillator 202 are passed through an ultra high frequency amplifier 204 and then supplied to a dipole 205 having a pencil-like beam projector 206, which projector is continuously disposed in the plane of the projector 192 and is movable angularly in this plane in the manner disclosed in the above mentioned application.

In order to determine the azimuthal position of the target, two dipole receiving antennae 207 and 208 are employed which may be in independent reflectors 209 and 209' which are placed side by side so that the zones of reception of antennae 207 and 208 are overlapping though slightly separated. If desired, these two antennae 207 and 208 may be contained in a single reflector such as 209 but located slightly to opposite sides of the focus thereof, thereby providing, in effect, two overlapping though slightly separated lobes of reception. The outputs of antennae 207 and 208 are now compared in magnitude, bearing in mind that when both of these antennae are similarly directed at the target, the signals received thereby will be equal, i. e., when the target is on the line mid-way between the zones of maximum reception of these two antennae. The outputs of 207 and 208 are supplied to two ultra high frequency amplifiers 210 and 210', respectively. These ultra high frequency amplifiers are also supplied with the carriers $f_1$, $f_2$ and $f_3$ as frequency modulated by oscillator 202, and also slightly modulated as to amplitude by modulator 211 fed from an oscillator 212. These double modulated carriers are passed through attenuators 213 and phase shifters 214 by way of lines 215 and 215' to ultra high frequency amplifiers 210 and 210' so that these amplifiers not only amplify the reflected transmitted signal as modified by the Doppler effect but also amplify the doubly modulated carriers supplied through lines 215 and 215'. The outputs of amplifiers 210 and 210' are mixed in mixers 216 and 216' wherein there is produced the modulation frequency of modulator 202, which is itself modulated by the Doppler frequency produced by mixing the transmitted and reflected signals. This mixed signal is further modulated by the presence of amplitude modulation from modulator 211. Amplifiers 217 and 217' are tuned to the frequency of oscillator 212 and hence pick off the modulation produced by modulator 211 and pass this modulation, respectively, to detectors 218 and 218' the output of which is compared in the network 219 as to magnitude, i. e., these outputs are connected in opposition and applied to control the gain of ultra high frequency amplifier 210'. The purpose of this is to maintain the over all gain of ultra high frequency amplifier 210 and 210' and mixers 216 and 216' equal so that equal amplification of the outputs of the antennae 207 and 208 takes place all to the end that the Doppler modulated output of mixers 216 and 216' may be compared as to magnitude to determine when the antennae 207 and 208 are directed similarly at the target.

The Doppler modulated frequency of oscillator 202 produced in mixers 216 and 216' is selected by filters 220 and 220' and fed to detectors and tuned amplifiers 221 and 221'. Where it is desired to reduce the sensitivity of the system as to nearby objects, then the filters 220 and 220' may be tuned to the fundamental frequency of oscillator 202. On the other hand, if it is desired to greatly reduce the sensitivity of the system to nearby objects and to extend the range of insensitivity to an appreciable distance and to further decrease the troubles from power pack, hum and noises, then in that event, these filters should be tuned to a harmonic of the frequency of oscillator 202. A suitable harmonic in this case would be a third harmonic.

The doppler frequency output of amplifiers 221 and 221' is rectified in detectors 222 and 222' and after rectification compared as to magnitude in a meter 223 of the zero center E. M. F. type. Thus, as long as the antennae 207 and 208 are similarly directed at the target, i. e., the target is on a line bisecting the angle determined by the axes of maximum sensitivity of the reflectors or the receivers 209 and 209', the meter 223 will read zero at its central position, deflecting from its central position as the target departs to one side or the other of this position, so that by observing meter 223 the operator can manipulate the reflector 209 and 209' to maintain the same on the target, or this may be done automatically by use of a suitable servo system. By taking off the azimuthal angular position of these reflectors 209 and 209' the information is provided for giving the azimuthal position of the target and may be fed into a fire control director, if desired. Automatic volume control of the amplifiers 221 and 221' is provided by use of resistor 224 across which the sum of the output voltages of the detectors is applied. This prevents meter 223 from going off scale.

Two additional receiving reflectors 225 and 225' are shown in Fig. 14B having antennae 226 and 226'. Here again the antennae 226 and 226' might be contained within a single reflector and positioned on opposite sides of the focus thereof, one above and one below the focus. If desired, these antennae and antennae 207 and 208 may be all contained within a single reflector in which the antennae 207 and 208 are disposed transversely on opposite sides of the focus, whereas 226 and 226' are disposed vertically on oppiste sides of the focus all as disclosed in the above-mentioned patent application. The outputs of antennae 226 and 226' are used for determining the distance or range of the target or object and for determining the elevational position of such target or object. To accomplish the former object it is necessary to pick off the several Doppler frequencies and compare them as to phase. This is accomplished by amplifying the received signals picked up by antenna 226 in ultra high frequency amplifier 227 bearing in mind that this mixed signal comprises F1. F2 and F3 as frequency modulated by oscillator 202 and altered by the Doppler frequency shift. This mixed signal is supplied to three mixers 228, 229, and 230 which are respectively supplied with $f_3$ as modulated by 202, $f_2$ as modulated by 202 and $f_1$ is modulated by 202, so that these mixers respectively supply to connected filters 231, 232 and 233 the frequency of modulator 202 as modulated respectively by the Doppler frequency shift of $f_3$, the Doppler frequency shift of $f_2$ and the Doppler frequency of $f_1$, which three signals are fed to detectors and tuned amplifiers 234, 235 and 236, wherein the respective Doppler frequencies of $f_3$, $f_2$ and $f_1$ are detected and amplified. The Doppler frequencies are compared as to phase in the phase comparator 237 which phase comparator may be of the type disclosed in Fig. 4, providing a coarse and fine distance measurement of the target or object. Here again by using filters 231 to 233 tuned to a harmonic of 202 instead of the fundamental the system is desensitized as to nearby objects so that utility of the same is enhanced.

In order to determine the elevational position of the target, the output of one of the mixers 228 to 230 is supplied to a tuned amplifier 238 like device 217 in Fig. 14A. Similarly, the output of antenna 226' after amplification in amplifier 227' has its output mixed in mixer 230' with $f_1$ as modulated by 202, thereby producing the output of 202 modulated at the Doppler frequency which is supplied to a filter 233' which picks off the modulation frequency of 202 or the harmonic thereof and supplies this to detector and tuned amplifier 236'. Similarly, the tuned amplifier 236 takes the place of the amplifier 221 of Fig. 14A. The outputs of amplifiers 236 and 221' are supplied to detectors 239 and 239' which rectify the Doppler frequencies and apply the resultant direct voltages in series opposition to a meter 223' similar to meter 223 of Fig. 14A, thereby enabling the elevational position of the object to be determined.

Means are provided in Fig. 14B similar to Fig. 14A for keeping the amplification ratio of amplifiers 227 and 227' equal so that a proper comparison of the magnitude of the Doppler frequencies is obtained in meter 223' for the purpose of locating the target on the line bisecting the lines of maximum sensitivity of antennae 226 and 226'. Amplifiers 221, 221', 234, 235, 236, and 236' are shown gang tuned. Thus, this system of Figs. 14A and 14B provides indication as to the radial speed, the azimuthal and elevational angles of the target and the distance thereof from the equipment of this invention.

Frequency modulator oscillator 202 supplies frequency modulation to all three radiated frequencies $f_1$, $f_2$ and $f_3$. If one of these frequencies is reflected from a distant object, the frequency of the received reflected energy ignoring Doppler shift will be different from the frequency being radiated at that instant by a small amount which is equal to the change in frequency which has occurred during the time of transit of the signal. Hence, when the local signal has increased in frequency, for example, the phase of the local signal will be advanced with respect to the phase of the reflected signal, and when the local signal has decreased in frequency the phase of the local signal will be retarded with respect to the reflected received frequency. Hence, if these two frequencies are heterodyned there will be a periodic fluctuation of the phases of these two signals at the frequency of oscillator 202 and this periodic fluctuation in phase will appear as a detected signal of the frequency of 202 or a harmonic thereof. Hence, if filters 199, 220, 220', 231, 232, 233 and 233' are tuned to the frequency of oscillator 202 a signal of this frequency will be excited in these filter circuits by the presence of a reflecting object. If the intensity of reflection were independent of the distance of the reflecting object this signal would increase linearly with the distance because the phase displacement of wobble previously described will increase with the increase in time interval between transmission and reception of the signals. However, as is well known, the amplitude of the return signal will decrease with the distance although the sensitivity of the receiver increases with the distance and these two effects will tend to compensate each other. The reflected signal will actually decrease in amplitude as the square of the distance and so since this device when the first harmonic is used increases in sensitivity as the first power of distance, the overall results will be a decrease in sensitivity as the first power of the distance. If the filters 199, 220, 220', 231, 232, 233 and 233' are tuned to, say, the second harmonic of oscillator 202 the sensitivity of the device will increase as the square of the distance and hence the overall sensitivity will not change with distance until the limiting ranges are approached. Similarly, the third harmonic may be used in which case the overall sensitivity at the point of transmission is actually zero and will increase toward a maximum and will then fall off again as the limiting range is approached. The distance of the limiting range is not much affected by the harmonic used. It must be pointed out that in changing from the first harmonic to higher harmonics the amplitude of the frequency modulation must be altered by the proper amount to give a maximum response in each case at the limiting range. The selection of higher harmonics for these filters 199, 220, 220', 231, 232, 233 and 233' has the added advantage that a great deal of trouble with microphonics and power pack hums will be eliminated. It is possible by use of a relatively high harmonic with this type of apparatus to produce a device which will give an alarm when an airplane or other target passes through a certain distant zone and the device will not respond to objects flying closer than this zone.

In the event that the frequency generator 188 is of the type shown on Fig. 8, the frequency modulator of Fig. 10 designated 241 may be used for supplying the desired frequency modulation shown in Fig. 14A as supplied by 202. This modulator 241 is of the type disclosed in the article by Eastman and Scott, entitled, "Transmission lines as frequency modulators," Proc. I. R. E., vol. 22, No. 7, page 878, and would appear to require no further description.

The material disclosed in Figs. 1, 2 and 5 is claimed in Patent No. 2,408,825, issued October 8, 1946, and the material of Fig. 6 is claimed in Patent No. 2,412,640, issued December 17, 1946.

What is claimed is:

1. In an apparatus of the character described, means for transmitting a plurality of ultra high frequencies, means for receiving said frequencies after reflection from a remote object having a distance to said apparatus changing with time, means for mixing said received frequencies with their respective transmitted frequencies to produce Doppler beat notes, and means for comparing the beat notes as to phase for determining the distance of the object.

2. Apparatus for measuring the distance of a remote object comprising means for projecting electromagnetic radiation containing a plurality of ultra high frequencies, means for mixing each of said ultra high frequencies with its respective reflection from the remote object to produce a plurality of beat frequencies, and means for comparing the phase relations existing between said beat frequencies to determine the distance of said object.

3. A radio wave distance measuring device comprising means for generating a plurality of high frequency oscillations of slightly different frequencies, means for radiating electromagnetic waves of said frequencies, means for receiving said waves after reflection from a remote object having relative motion with respect to said distance measuring device, means for heterodyning said received electromagnetic waves with their respective generated frequencies, and means for comparing the phases of the beat frequencies so produced to determine the distance of said object.

4. In apparatus of the character described, means for generating ultra high frequency energy, means for frequency modulating said energy, means for radiating said energy into space in the form of electromagnetic waves, means for receiving a portion of said energy after reflection from a remote object, means for mixing said frequency modulated radiated energy with the reflected energy to produce a wave that has a frequency harmonically related to the frequency of the frequency modulation and that increases in magnitude with the time delay of the reflected signal.

5. Apparatus for determining the position data of remote objects comprising means for generating ultra high frequency energy, means for frequency modulating said energy, a transmitter fed with said frequency modulated ultra high frequency energy for radiating frequency modulated electromagnetic waves into space, a receiver of electromagnetic energy for receiving said waves after reflection from the remote object, a mixer fed from said receiver and from said transmitter for comparing the transmitted waves with their reflection from the remote object producing a wave comprising the fundamental and harmonics of the frequency of said frequency modulation, which wave is amplitude modulated by the Doppler shift frequency due to any relative motion between the object and the apparatus and increases in magnitude with the time delay of the reflected signal, thereby reducing the disturbances in the apparatus otherwise caused by the presence of nearby objects.

6. Apparatus for determining the position data of a remote object comprising means for generating ultra high frequency energy, means for frequency modulating said energy, a transmitter fed with said frequency modulated ultra high frequency energy for radiating frequency modulated electromagnetic waves into space, a receiver of electromagnetic energy for receiving said waves after reflection from the remote object, a mixer fed from said receiver and from said transmitter for comparing the transmitted waves with their reflections from the remote object producing a wave of a frequency that is a multiple of the approximate frequency of the frequency modulation, said wave serving as a carrier for Doppler shift frequency positional signals.

7. Apparatus as defined in claim 6 wherein means is provided for selecting said multiple frequency from the output of said mixer for use in obtaining position data of the output.

8. Apparatus for measuring the distance of a remote object comprising, means for alternately transmitting pairs of different frequencies, the respective frequencies of each pair having a fixed frequency difference therebetween, the frequency difference between one pair being a multiple of that of the other pair of frequencies, means for receiving said frequencies after reflection from a remote object, means for mixing the reflected frequency of each pair with its respective transmitted frequency, means for alternately comparing the phases of the beat frequencies thus produced, and indicator means connected to said phase comparing means for providing a coarse distance scale including the useful range of the apparatus and a fine distance scale including a submultiple of the coarse scale equal to the reciprocal of the aforesaid multiple.

9. In apparatus for measuring the distance of a remote object means for radiating three ultra high frequencies, the first and third of said frequencies having a frequency difference that is a multiple of the frequency difference between the first and second of said frequencies, a receiver for receiving said frequencies as reflected from the remote object, mixing means for mixing said received frequencies separately with the third of said transmitted frequencies and with one of the other transmitted frequencies, thereby producing the difference frequencies between said first and third and said second and third frequencies plus the Doppler shift of the first and second frequencies, together with the different frequency of said one of the other transmitted frequencies and said third frequency plus the Doppler shift of the latter, tuned amplifier means for amplifying said frequency differences plus the Doppler shifts, all of said difference frequencies being fairly large, thereby substantially eliminating microphonic and other noises during amplification, and mixer means connected to said amplifier means for separately mixing said Doppler shifted frequency differences with corresponding unaltered frequency differences thereby separately producing Doppler beat notes of said first, second, and third frequencies.

10. Apparatus for measuring the distance of a remote object comprising means for transmitting three ultra high frequency waves, the waves having fixed frequency differences therebetween, the frequency difference between the first and the second waves being a submultiple of that between the first and the third waves, means for receiving the waves after reflection from a remote object, means for mixing the reflected waves with their respective transmitted waves, means for comparing the phases of the beat frequencies thus produced, said phase comparing means providing a coarse distance scale including the useful range of the apparatus and a fine distance scale including a portion of the coarse scale equal to the aforesaid submultiple.

11. Apparatus according to claim 10 wherein a plurality of transmitted frequencies are employed to provide a plurality of distance scales equal to one less than the number of transmitted frequencies.

12. In a system of the character described, means for generating ultra high frequency energy, means for radiating the energy into space, means for slightly modulating a portion of the energy not radiated, dual means for receiving the energy after reflection from a remote object, dual amplifier means supplied by the modulated energy and respectively connected to said receiving means, dual mixer means respectively connected to said amplifier means, dual filter means respectively connected to the outputs of said mixer means for selecting the frequency of the modulation, balanced rectifier means supplied by said filter means for producing a voltage proportional to the difference in the gains of said dual amplifiers and mixers, and means for utilizing the voltage thus produced to equalize the aforementioned gains.

13. An object detection and location system comprising means for generating waves of a plurality of ultra high frequencies, means for frequency modulating the waves, means for radiating the waves into space, means for receiving the waves after reflection from a remote object having relative motion with respect to said system, means for separately mixing the reflected waves with their respective radiated waves to produce low frequency waves having their frequency determined by the frequency of the frequency modulation, said low frequency waves increasing in magnitude with the time delay of the reflected waves and being further amplitude modulated by the Doppler shift frequency of their respective reflected wave, filter means connected to said mixing means for passing a desired harmonic of the amplitude modulated waves, detecting means supplied by said filter means for producing the Doppler shift frequencies, and means for comparing the phase relations existing between the Doppler shift frequencies to determine the distance to the object.

14. A method of desensitizing an object detecting and locating system to nearby objects comprising, generating an ultra high frequency wave, frequency modulating the wave, radiating the wave into space, receiving the wave after reflection from a remote object having relative motion with respect to the system, mixing the radiated and received waves thereby producing a low frequency wave containing harmonics of the frequency of the frequency modulation, the harmonic content of the wave increasing with the distance to the remote object, the wave being amplitude modulated by the Doppler shift frequency due to the relative motion, selecting a harmonic of the wave according to the desired sensitivity versus distance characteristic of the system, and detecting the positional data yielding Doppler shift frequency.

15. An object detection and location system comprising means for generating ultra high frequency energy, means for frequency modulating the energy, means for radiating the energy into space, means for receiving a portion of the energy after reflection from a remote object having relative motion with respect to said system, means for mixing radiated and received energies to produce a wave having a frequency determined by the frequency of the frequency modulation, said wave being amplitude modulated by the Doppler shift frequency due to the relative motion, filter means connected to said mixing means for passing a desired harmonic of said wave, and means for detecting the Doppler shift frequency whereby the presence of the object is revealed.

16. Apparatus as defined in claim 15 wherein means is provided to measure the frequency of the Doppler shift frequency and thereby indicate the radial speed of said object.

17. In apparatus of the character described, means for generating ultra high frequency energy, means for frequency modulating said energy, means for radiating said energy into space, means for receiving a portion of said energy after reflection from a remote object having relative motion with respect to said apparatus, means for mixing said frequency modulated radiated energy with the reflected energy to produce a wave that has a frequency harmonically related to the frequency of the frequency modulation and that increases in magnitude with the time delay of the reflected energy, said wave being further amplitude modulated by the Doppler shift frequency due to the relative motion.

18. In apparatus of the character described, means for generating ultra high frequency energy, means for frequency modulating said energy, means for radiating said energy into space in the form of electromagnetic waves, means for receiving a portion of said energy after reflection from a field of view, means for mixing said frequency modulated radiated energy with the reflected energy to produce a beat frequency, detector means for demodulating said beat frequency to produce a Doppler frequency, and means utilizing said Doppler frequency for indicating the presence of a moving object.

RUSSELL H. VARIAN.
WILLIAM W. HANSEN.
JOHN R. WOODYARD.

REFERENCES CITED

The following references are of record in the file of this patent:

UNITED STATES PATENTS

| Number | Name | Date |
|---|---|---|
| 2,085,798 | Gerhard | July 6, 1937 |
| 2,231,929 | Lyman | Feb. 18, 1941 |
| Re. 21,955 | Chaffee | Nov. 25, 1941 |
| 2,237,792 | Roosenstein | Apr. 8, 1941 |
| 2,178,074 | Jakel et al. | Oct. 31, 1939 |
| 2,248,442 | Stocker | July 8, 1941 |
| 1,428,353 | Anderson et al. | Sept. 5, 1922 |
| 2,223,224 | Newhouse | Nov. 26, 1940 |
| 2,261,272 | Newhouse | Nov. 4, 1941 |
| 1,238,220 | Thurber | Aug. 28, 1917 |
| 1,932,469 | Leib et al. | Oct. 31, 1933 |
| 1,750,668 | Green | Mar. 18, 1930 |
| 2,045,072 | Espenscheid | June 23, 1936 |
| 2,045,071 | Espenscheid | June 23, 1936 |
| 2,236,893 | Chaffee | Apr. 1, 1941 |
| 2,268,643 | Crosby | Jan. 6, 1942 |

FOREIGN PATENTS

| Number | Country | Date |
|---|---|---|
| 302,602 | Great Britain | May 30, 1929 |
| 472,891 | Great Britain | Sept. 29, 1937 |

Certificate of Correction

Patent No. 2,435,615.  February 10, 1948.

RUSSELL H. VARIAN ET AL.

It is hereby certified that errors appear in the printed specification of the above numbered patent requiring correction as follows: Column 6, line 6, after the word "apparatus" strike out the numeral "1"; lines 70 and 71, for "bulge 41" read *bulge 41'*; column 16, line 41, for "oppiste" read *opposite*; line 53, for "F1, F2 and F3" read $f_1, f_2$ and $f_3$; column 17, line 14, for "221'" read *236'*; column 20, line 15, for the word "different" read *difference*; and that the said Letters Patent should be read with these corrections therein that the same may conform to the record of the case in the Patent Office.

Signed and sealed this 25th day of May, A. D. 1948.

[SEAL]

THOMAS F. MURPHY,
*Assistant Commissioner of Patents.*